United States Patent
Park et al.

(10) Patent No.: US 12,556,352 B2
(45) Date of Patent: Feb. 17, 2026

(54) METHOD AND DEVICE FOR DETECTING ASYNCHRONOUS INTERFERENCE IN TDD CELLULAR NETWORK

(71) Applicant: Samsung Electronics Co., Ltd., Suwon-si (KR)

(72) Inventors: Sangkyu Park, Suwon-si (KR); Panhyung Lee, Suwon-si (KR); Soonyoung Yoon, Suwon-si (KR); Jinho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 299 days.

(21) Appl. No.: 18/332,210

(22) Filed: Jun. 9, 2023

(65) Prior Publication Data

US 2023/0318800 A1    Oct. 5, 2023

Related U.S. Application Data

(63) Continuation of application No. PCT/KR2022/000582, filed on Jan. 12, 2022.

(30) Foreign Application Priority Data

Jan. 12, 2021    (KR) .................. 10-2021-0004107

(51) Int. Cl.
*H04L 5/14*    (2006.01)
*H04B 17/318*    (2015.01)

(52) U.S. Cl.
CPC ............. *H04L 5/14* (2013.01); *H04B 17/318* (2015.01)

(58) Field of Classification Search
CPC ....... H04L 5/14; H04L 5/0073; H04L 5/1469; H04B 17/318; H04B 17/345;
(Continued)

(56) References Cited

U.S. PATENT DOCUMENTS 7,149,476 B2    12/2006    Shah
8,630,229 B2    1/2014    Himayat et al.
(Continued)

FOREIGN PATENT DOCUMENTS

CN    103200577 B    7/2013
KR    10-0345027 B1    7/2002
(Continued)

OTHER PUBLICATIONS

Nortel; Discussion on the DL Interference Coordination; 3GPP TSG-RAN WG1#51 R1-074641; Nov. 9, 2007, Jeju, Korea.
(Continued)

*Primary Examiner* — Walli Z Butt
(74) *Attorney, Agent, or Firm* — Jefferson IP Law, LLP

(57) ABSTRACT

The disclosure relates to a communication technique that merges Internet of things (IoT) technology with a $5^{th}$ generation (5G) communication system for supporting higher data transmission rates than $4^{th}$ generation (4G) systems, and a system for same. A method and a device for specifying a cell generating an asynchronous interference are provided. The method includes obtaining base station related information including a location for each base station and received signal strength indication (RSSI) information for each symbol from a base station, identifying whether a cell related to the base station is a cell in which asynchronous interference occurs between cells based on the RSSI information for each symbol, grouping cells in which the asynchronous interference between cells occurs based on the location for each of the base station, determining a type of asynchronous interference between cells, and determining a cell that generates the asynchronous interference between cells.

13 Claims, 14 Drawing Sheets

(58) Field of Classification Search
CPC ..... H04J 11/005; H04W 16/10; H04W 24/02; H04W 56/0045
See application file for complete search history.

(56) References Cited

U.S. PATENT DOCUMENTS

| | | |
|---|---|---|
| 9,338,754 B2 | 5/2016 | Fu et al. |
| 9,820,169 B2 | 11/2017 | Chou |
| 10,009,904 B2 | 6/2018 | Wang et al. |
| 10,123,216 B2 | 11/2018 | Park et al. |
| 10,250,362 B2 | 4/2019 | Marinier et al. |
| 2016/0286561 A1* | 9/2016 | Huang ............... H04L 1/00 |
| 2016/0360463 A1* | 12/2016 | Kim ............... H04W 72/0446 |
| 2017/0063484 A1* | 3/2017 | Naghshvar ........... H04B 17/318 |
| 2017/0265203 A1 | 9/2017 | Na et al. |
| 2018/0146332 A1 | 5/2018 | Opshaug et al. |
| 2019/0273600 A1 | 9/2019 | Wang et al. |
| 2022/0312434 A1 | 9/2022 | Wilkinson et al. |

FOREIGN PATENT DOCUMENTS

| | | |
|---|---|---|
| KR | 10-2013-0127668 A | 11/2013 |
| KR | 10-1493793 B1 | 2/2015 |
| KR | 10-1611608 B1 | 4/2016 |
| KR | 10-2017-0002170 A | 1/2017 |
| KR | 10-2018-0035707 A | 4/2018 |
| KR | 10-1983226 B1 | 5/2019 |
| WO | 2012/091450 A2 | 7/2012 |
| WO | 2018/062873 A1 | 4/2018 |

OTHER PUBLICATIONS

Nicholas Krawczeniuk, 'Analysis of LTE Network RF Performance in a Dense Urban Environment', Aug. 18, 2019., Pace University.
International Search Report and Written Opinion dated Apr. 18, 2022, issued in an International Application No. PCT/KR2022/000582.
Korean Office Action with English translation dated Nov. 7, 2025; Korean Appln. No. 10-2021-0004107.

* cited by examiner

FIG. 7

METHOD AND DEVICE FOR DETECTING ASYNCHRONOUS INTERFERENCE IN TDD CELLULAR NETWORK

CROSS-REFERENCE TO RELATED APPLICATION(S)

This application is a continuation application, claiming priority under § 365(c), of an International application No. PCT/KR2022/000582, filed on Jan. 12, 2022, which is based on and claims the benefit of a Korean patent application number 10-2021-0004107, filed on Jan. 12, 2021, in the Korean Intellectual Property Office, the disclosure of which is incorporated by reference herein in its entirety.

BACKGROUND

1. Field

The disclosure relates to a wireless communication system. More particularly, the disclosure relates to a method and device for detecting asynchronous interference in a time division duplex (TDD) cellular network.

2. Description of Related Art

An effort is being made to develop an improved 5$^{th}$ generation (5G) communication system or a pre-5G communication system in order to meet the increasing demand for wireless data traffic after the commercialization of a 4$^{th}$ generation (4G) communication system. For this reason, the 5G communication system or the pre-5G communication system is called a communication system after the 4G network (beyond 4G network) or system after the long-term evolution (LTE) system (Post LTE). In order to achieve a high data rate, the 5G communication system is being considered for implementation in a super high frequency (mmWave) band (e.g., such as a 60 giga (60 GHz) band). In order to alleviate the path loss of radio waves in the super high frequency band and increase the transmission distance of radio waves, in the 5G communication system, beam-forming, massive multiple input-multiple output (MIMO), full dimensional MIMO (FD-MIMO), array antenna, analog beam-forming, and large scale antenna technologies are being discussed. In addition, in order to improve the network of the system, in the 5G communication system, technologies, such as evolved small cell, advanced small cell, cloud radio access network (cloud RAN), ultra-dense network, device to device communication (D2D), wireless backhaul, moving network, cooperative communication, coordinated multi-points (CoMP), interference cancellation, and the like are being developed. In addition, in 5G system, an advanced coding modulation (ACM) method, such as hybrid frequency shift keying and quadrature amplitude modulation (FQAM) and sliding window superposition coding (SWSC), and an advanced connection technology, such as filter bank multi carrier (FBMC), non-orthogonal multiple access (NOMA), and sparse code multiple access (SCMA), and the like are being developed.

Meanwhile, the Internet is evolving from a human-centered network in which humans generate and consume information to an Internet of things (IoT) network that exchanges and processes information between distributed components, such as an object, and the like. Internet of everything (IoE) technology, which combines big-data processing technology, and the like through connection with a cloud server, and the like with IoT technology, is also emerging. In order to implement IoT, technology elements, such as sensing technology, wired and wireless communication and network infrastructure, service interface technology, and security technology are required, and recently, a technology, such as sensor network, machine to machine (M2M), and machine type communication (MTC), and the like for connection between objects has been studied. In an IoT environment, an intelligent internet technology (IT) service that create a new value in human life by collecting and analyzing data generated from connected objects may be provided. IoT may be applied to field, such as a smart home, a smart building, a smart city, a smart car or connected car, a smart grid, health care, a smart home appliance, and an advanced medical service, and the like through convergence and combination between an existing information technology (IT) technology and a various industry.

Accordingly, various attempts are being made to apply the 5G communication system to the IoT network. For example, technologies, such as sensor network, machine to machine (M2M), machine type communication (MTC), and the like are being implemented by techniques, such as beamforming, MIMO, array antenna, and the like, which are 5G communication technologies. The application of cloud radio access network (cloud RAN) as a big data processing technology described above may be an example of the convergence of 5G technology and IoT technology.

Recently, however, in network management, a method has been studied to reduce manpower and time required to automatically detect and solve problems caused by TDD asynchronous interference without human intervention.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and a device for controlling collisions occurring when frequency resources are dynamically shared. Specifically, in case that asynchronous interference occurs between cells, a method and a device for specifying a cell generating the asynchronous interference are provided.

Additional aspects will be set forth in part in the description which follows and, in part, will be apparent from the description, or may be learned by practice of the presented embodiments.

In accordance with an aspect of the disclosure, a method for preventing asynchronous interference between time division duplex (TDD) cells of a network management node in a wireless communication system is provided. The method includes obtaining base station related information including a location for each base station and received signal strength indication (RSSI) information for each symbol from at least one base station, and identifying whether a cell related to the at least one base station is a cell in which asynchronous interference occurs between cells based on the RSSI information for each symbol, grouping cells in which the asynchronous interference between cells occurs based on the location for each of the base station based on the identification result, and determining a type of asynchronous interference between cells in a cell that generates the asynchronous interference between cells based on the grouping result and a number of cells in which the asynchronous interference between cells occurs, and determining a cell that generates the asynchronous interference between cells based on the determination result.

In accordance with aspect of the disclosure, a network management node for preventing asynchronous interference between time division duplex (TDD) cells in wireless communication systems is provided. The network management node includes a transceiver and at least one processor configured to obtain base station related information including a location for each base station and received signal strength indication (RSSI) information for each symbol from at least one base station, and identify whether a cell related to the at least one base station is a cell in which asynchronous interference occurs between cells based on the RSSI information for each symbol, group cells in which the asynchronous interference between cells occurs based on the location for each of the base station based on the identification result, and determine a type of asynchronous interference between cells in a cell that generates the asynchronous interference between cells based on the grouping result and a number of cells in which the asynchronous interference between cells occurs, and determine a cell that generates the asynchronous interference between cells based on the determination result.

According to the disclosure, a victim cell due to TDD asynchronous interference is detected from network collected data, and an aggressor cell or an aggressor entity is specified. A network operator can automatically know the extent of damage caused by TDD asynchronous interference without human intervention, can quickly take action by checking and taking action on a specific aggressor cell, and can reduce manpower and time required to detect and solve problems.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a diagram illustrating a process of determining a type of asynchronous interference based on the geo-clustering result according to an embodiment of the disclosure;

Throughout the drawings, it should be noted that like reference numbers are used to depict the same or similar elements, features, and structures.

DETAILED DESCRIPTION

Figure 1:
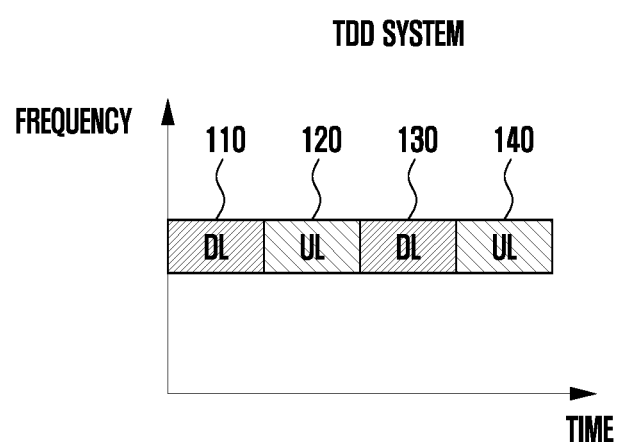
FIG. 1 is a diagram illustrating a resource structure for a traffic transmission method of a TDD system in LTE and LTE-advanced (LTE-A) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Some components may be exaggerated, omitted, or schematically illustrated in the accompanying drawing. In addition, a size of each component does not fully reflect the actual size. The same or corresponding components in each drawing are assigned the same reference number.

An advantage and a feature of the disclosure and a method for achieving them may become apparent with reference to the embodiments described below together with the accompanying drawing. The disclosure is not limited to the embodiments disclosed below, and may be implemented in different various forms, and only the embodiments are provided to make the disclosure complete, and to completely inform the scope of the disclosure to those skilled in the art to which the disclosure belongs, and the disclosure is only defined by the scope of the claim. Throughout the specification, the same reference numeral may refer to the same component.

In this case, it will be able to be understood that each block of processing flowchart drawings and combinations of flowchart drawings may be performed by computer program instructions. Since these computer program instructions may be mounted on a processor of a general-purpose computer, a special-purpose computer, or other programmable data processing equipment, the instructions performed through the processor of the computer or the other programmable data processing equipment create a means to perform the functions described in the flowchart block(s). Since these computer program instructions may also be stored in computer-usable or computer-readable memory that may be oriented toward the computer or the other programmable data processing equipment to implement the function in a particular way, the instructions stored in the computer-usable or computer-readable memory may also produce a manufacturing item containing the instruction means that perform the function described in the flowchart block(s). Since the computer program instructions may also be mounted on the computer or the other programmable data processing equipment, instructions in which a series of operational steps are performed on the computer or the other programmable data processing equipment and creates a computer-executed process and performs the computer or the other programmable data processing equipment, may also provide steps for executing the functions described in the flowchart block(s).

In addition, each block may represent a module, segment, or a part of code including one or more executable instructions for executing a specific logical function(s). In addition, it should also be noted that in some alternative implementations example, it may be possible for the functions mentioned in the blocks to occur out of order. For example, two blocks illustrated in succession may actually substantially be performed at the same time, or the blocks may sometimes be performed in reverse order according to the corresponding function.

In this case, the term '~unit' used in an embodiment of the disclosure means a software or a hardware component, such as field programmable gate array (FPGA) or application specific integrated circuit (ASIC), and the '~unit' may perform specific roles. However, '~unit' may not mean limited to the software or the hardware. The '~unit' may be configured to be in an addressable storage medium and may be configured to play one or more processors. Thus, as an example, the '~unit' includes components, such as software components, object-oriented software components, class components, and task components, processes, functions, attributes, procedures, subroutines, program code segments, drivers, firmware, microcode, circuit, data, database, data structures, tables, arrays, and variables. The functions provided within the components and the '~unit' may be combined into the smaller numbers of components and the '~units' or may further be separated into the additional components and the '~units'. In addition, the components and the '~units' may be implemented to play one or more central processing units (CPUs) in a device or a secure multimedia card. In addition, in an embodiment, the '~units' may include one or more processors.

A term for identifying the connection node, a term referring to network entities, a term referring to messages, a term referring to the interface between network objects, a term referring to various identification information, and the like used in the following description are illustrated for convenience of description. Thus, it is not limited to the terms used in the disclosure, and another term referring to an object having an equal technical meaning may be used.

For convenience of description below, terms and names defined in the standards for 5G, new radio (NR), and LTE systems are used in the disclosure. However, the disclosure is not limited by these terms and names, and may be equally applied to systems conforming to another standard.

In other words, in describing the embodiments of the disclosure, although the $3^{rd}$ generation partnership project (3GPP) will mainly target communication standards that have been specified, but the main gist of the disclosure may be applicable with minor modifications to another communication system having a similar technical background without significantly departing from the scope of the disclosure, and this will be possible at the judgment of a person with skilled technical knowledge in the technical field of the disclosure.

A wireless communication system has been developed to provide a communication service while ensuring user mobility. To this end, the wireless communication system introduced the concept of a cell, dividing the actual space into cells, which are virtual areas, and sending radio waves of appropriate intensity to allow base stations and terminals to communicate in this cell, allowing users to receive the communication service through wireless channels.

Due to the characteristics of radio waves, the edge portion of the cell relatively far from the source of radio waves comes into contact with a small intensity of radio waves and is affected by surrounding cells, making it impossible to provide an ideal service environment. This phenomenon is called interference of surrounding cells. In addition, as cell layouts become more diverse, for example, cases where small cells are built here and there in relatively large cells are occurring, so the interference environment is gradually diversifying.

In order to better deal with the diversified interference environment and to provide a better service environment to users, the wireless communication system based on cooperation between multiple cells is being introduced. Carrier Aggregation (CA) technology dealt with in the 3rd Generation Partnership Project (3GPP), dual connectivity technology, and Coordinated Multi-Point Transmission and Reception (CoMP) technology are examples of technologies for implementing the wireless communication system based on cooperation between several cells.

For cooperation between cells belonging to different base stations, it may be necessary to exchange information on cells between base stations. The exchange of cell information between base stations may be performed through an interface directly connected between base stations or through several interfaces through at least one other entity.

In the specification, the base station may refer to at least one of an evolved Node B (eNB), a Node B (NB) or a Radio Network Subsystem (RNS) including the same, a Base Transceiver Station (BTS) or a Base Station Subsystem (BSS) including the same, a home eNB, a home NB, a home eNB gateway (GW), and an X2 GW.

In addition, the base station may provide the communication service to the terminal by using one or more cells. The base station means a device that manages and controls a cell, but in the specification, for convenience, the cell and the base station may be described by being used interchangeably.

Prior to the detailed description, a time division duplex (TDD) system in LTE and LTE-A systems will be described with reference to drawings. The TDD system below illustrates a resource structure for a traffic transmission method in LTE and LTE-A, but a similar resource structure may be applied to 5G or other communication systems.

FIG. 1 is a diagram illustrating a resource structure for a traffic transmission method of a TDD system in LTE and LTE-A according to an embodiment of the disclosure.

Referring to FIG. 1, the TDD system divides resources of the same frequency band on a time axis and transmits uplink (hereinafter, 'UL') or downlink (hereinafter, 'DL') traffic in units of subframes.

In the TDD system, the same carrier frequency is used for both UL transmissions 120, 140, which are communication from the terminal to the base station, and DL transmissions 110, 130, which are communication from the base station to the terminal. In the TDD system, the carrier frequency may be divided into a series of time slots and/or subframes in the time domain. At a single carrier frequency, some time slots are allocated to the UL transmission and other time slots to the DL transmission.

Depending on the traffic load of the UL and the DL, the network entity may operate by evenly dividing subframes for the UL/the DL in the time domain or may operate by allocating more subframes to the DL, or by allocating more subframes to the UL. In the LTE, the length of the subframe is 1 ms, and 10 subframes are gathered to form a single radio frame.

Figure 2:
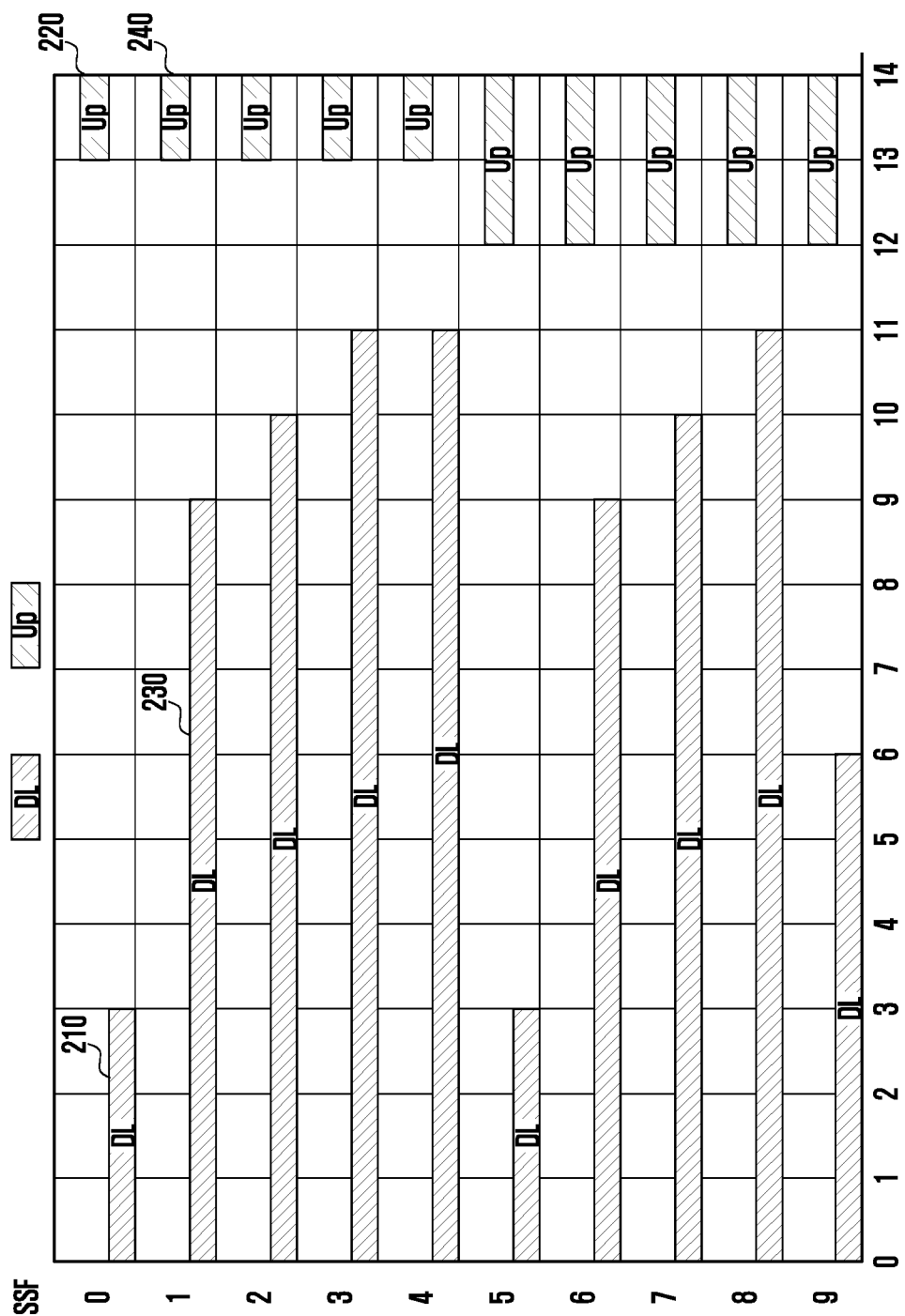
FIG. 2 is a diagram illustrating an example of various settings according to SSF configuration according to an embodiment of the disclosure.

FIG. 2 is a diagram illustrating various settings according to SSF configuration according to an embodiment of the disclosure.

Referring to FIG. 2, in the TDD system, each subframe is divided into a DL subframe, a UL subframe, and a special subframe (SSF). The special subframe (SSF) is defined between the DL subframe and the UL subframe. The SSF is configured with an uplink pilot time slot (UpPTS), a guard period (GP), and a downlink pilot time slot (DwPTS), and various settings are possible according to the SSF configuration.

FIG. 2 is a diagram illustrating a case in which the SSF configuration is defined from 0 to 9 under normal cyclic prefix. For example, in case that the SSF configuration is 0, the DwPTS 210 may be allocated to the first, second, and third symbols, the GP may be allocated from the fourth to the 13th symbols, and the UpPTS may be allocated to the 14th symbol.

In addition, as shown in Table 1, various DL, UL, and SSF allocation combinations 220, 230, and 240 may be used according to the UL/DL configuration by using the SSF.

For example, in case that the UL/DL configuration is 0, the DL may be allocated to the first and fifth subframes among a total of 10 subframes, the SSF may be allocated to the second and fifth subframes, and UL may be assigned to the remaining subframes.

TABLE 1

| Configuration | 3GPP release | Downlink to uplink switch point periodicity (ms) | Subframe number | | | | | | | | | | Number of subframes/frame | | |
|---|---|---|---|---|---|---|---|---|---|---|---|---|---|---|---|
| | | | 0 | 1 | 2 | 3 | 4 | 5 | 6 | 7 | 8 | 9 | D [DL] | U [UL] | S [SSF] |
| 0 | 8 | 5 | D | S | U | U | U | D | S | U | U | U | 2 | 6 | 2 |
| 1 | 8 | 5 | D | S | U | U | D | D | S | U | U | D | 4 | 4 | 2 |
| 2 | 8 | 5 | D | S | U | D | D | D | S | U | D | D | 6 | 2 | 2 |
| 3 | 8 | 10 | D | S | U | U | U | D | D | D | D | D | 6 | 3 | 1 |
| 4 | 8 | 10 | D | S | U | U | D | D | D | D | D | D | 7 | 2 | 1 |
| 5 | 8 | 10 | D | S | U | D | D | D | D | D | D | D | 8 | 1 | 1 |
| 6 | 8 | 5 | D | S | U | U | U | D | S | U | U | D | 3 | 5 | 2 |

Figure 3:
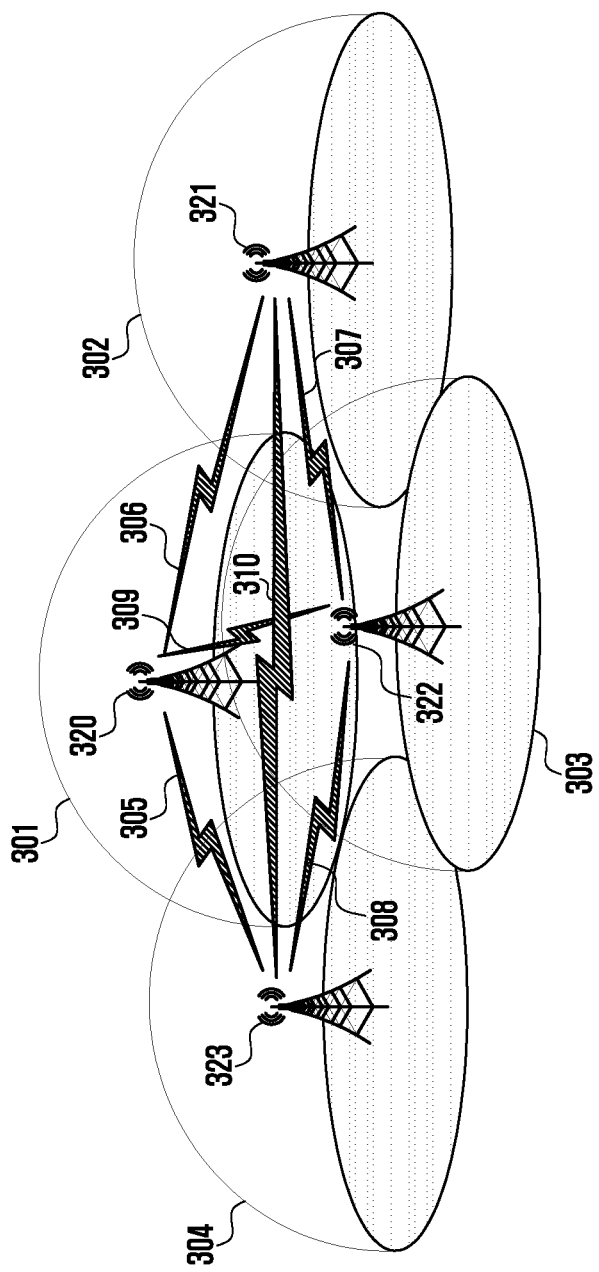
FIG. 3 illustrates a propagation distance between adjacent base stations according to an embodiment of the disclosure.

FIG. 3 illustrates a propagation distance between adjacent base stations according to an embodiment of the disclosure.

Referring to FIGS. 3, 301, 302, 303, and 304 indicate coverage of four adjacent base stations 320 to 323. 305 to 310 indicate that a first base station 320 may cause interference to each base station 321 to 323. For example, the interference may mean an effect of radio waves generated during downlink transmission in the first base station 320 on uplink transmission in the second base station 321. The interference may be expressed as a collision between downlink and uplink. In addition, interference may be caused to a base station existing outside the coverage as well as a base station existing within the coverage. A base station adjacent to a specific base station means a base station existing within a certain distance from the specific base station regardless of the cell coverage of the specific base station.

Each base station may receive information on an adjacent base station or cell in order for the base station to effectively measure the interference of the adjacent cell and adjust the transmission power of the terminal existing in its own cell to control the interference caused by the adjacent cell. The information may include a geographical location of the base station, a signal quality (e.g., RSSI) measurement value, and the like.

The cell may be a macrocell and/or femtocell.

Figure 4A:
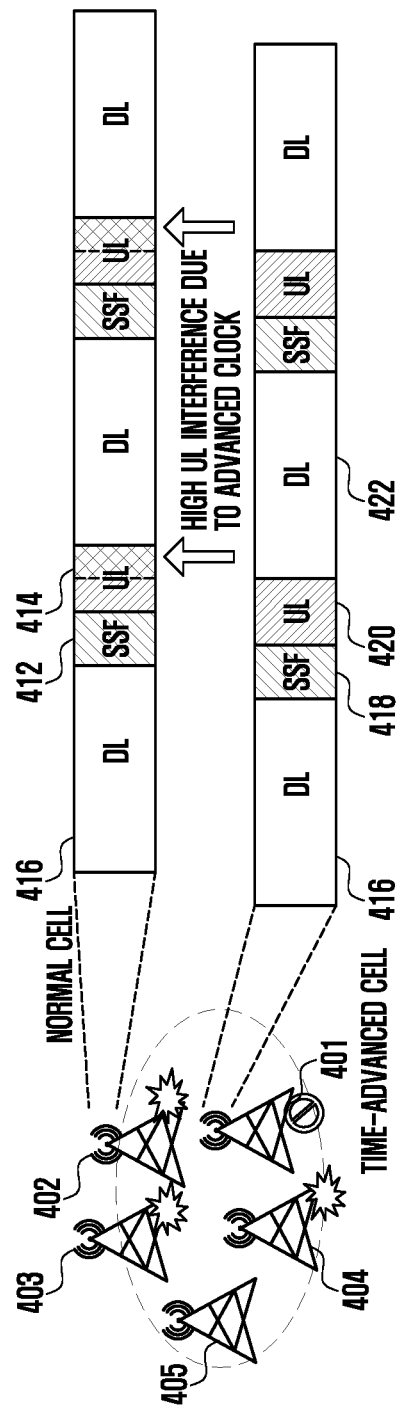
FIG. 4A is a diagram illustrating a first type (time-advanced case), which is one of types of interference between cells due to time asynchronous phenomenon between adjacent cells in a TDD system according to an embodiment of the disclosure.
Figure 4B:
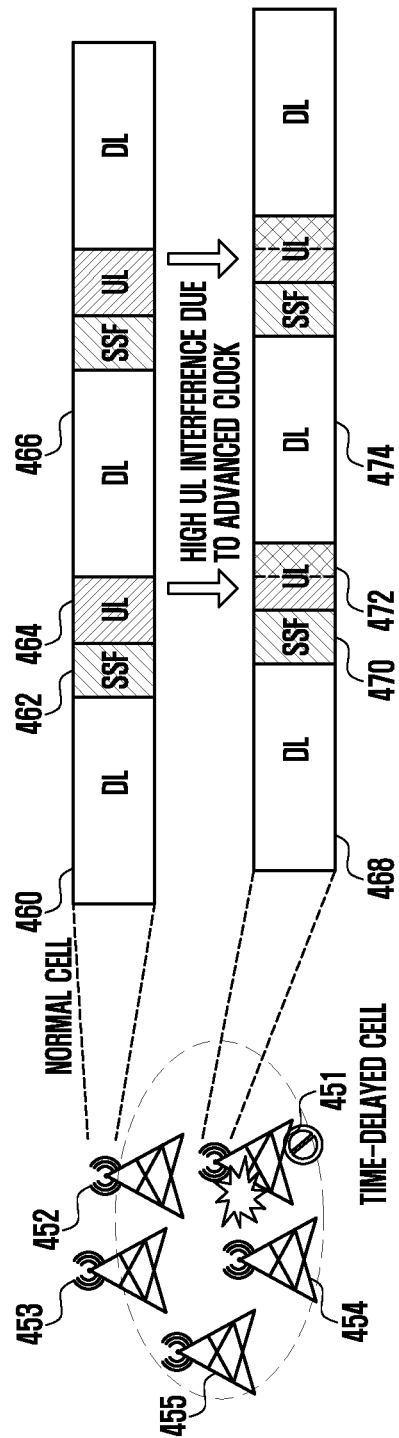
FIG. 4B is a diagram illustrating a second type (time-delayed case), which is one of types of inter-cell interference due to time asynchronous phenomenon between adjacent cells in a TDD system according to an embodiment of the disclosure.

FIGS. 4A and 4B are diagrams illustrating a type of interference between cells due to a time asynchronous phenomenon between adjacent cells in a TDD system according to various embodiments of the disclosure.

Referring to FIGS. 4A and 4B, the types that cause asynchronous interference between cells may be classified into a first type (time-advanced case) and a second type (time-delayed case).

Typically, a terminal is connected to a base station serving one communication cell. Transmission in other communication cells in the network typically generates an interference signal to the terminal. Due to the presence of this interference signal, a decrease in the maximum achievable data speed maintained for the terminal may typically occur. This interference is often referred to as 'intercell' interference.

In the TDD system, time synchronization between cells is essential to minimize and effectively manage intercell interference on the same carrier. The intercell interference may be divided into 'DL-to-UL intercell interference' (hereinafter, 'DL-to-UL interference') in which a cell transmitting DL traffic causes interference to a cell receiving UL traffic and 'UL-to-DL intercell interference' (hereinafter, 'UL-to-DL interference') in which a cell receiving UL traffic causes interference to a cell transmitting DL traffic.

In general, a wireless communication system is a multiple access system capable of supporting communication of multiple users by sharing a system resource (bandwidth, transmission power, and the like). Examples of multiple access used in the LTE system include orthogonal frequency division multiple access (OFDMA) and single carrier-frequency division multiple access (SC-FDMA). The OFDMA transmits and receives data by evenly dividing a specific band allocated to each user into multiple subcarriers, and the SC-FDMA is a technology that reduces peak to average power ratio (PAPR) of a signal by spreading data through an additional discrete Fourier transform (DFT) before loading data on subcarriers within an allocated band. In the LTE system, the OFDMA is adopted in the DL from the base station to the terminal, and the SC-FDMA is adopted in the UL from the terminal to the base station, and since the SC-FDMA may reduce power consumption of the terminal by minimizing the PAPR, the SC-FDMA is used for the UL. Since the transmission power of the base station is about 100 times greater than the transmission power of the terminal, the influence of the DL-to-UL interference may be much greater than that of the UL-to-DL interference. Thus, each embodiment will be described below on the premise that the intercell interference is the DL-to-UL interference.

It is common for a network operator to use the same U/D configuration for the same carrier as much as possible in order to prevent the intercell interference, may prevent time asynchronous phenomena between cells by monitoring an alarm related to signal quality and clock for TDD cells in a wide area. Nevertheless, an asynchronous problem of a specific network node may occur due to a problem of the network node itself. The problem of the network node itself may include a clock module, a global positioning system (GPS) reception antenna, a common public radio interface (CPRI) timing correction problem between a digital unit (DU) and a radio unit (RU) in a base station, and the like. When the intercell time asynchrony problem occurs, the DL-to-UL interference occurs, and the base station receiving the interference may not be able to receive UL traffic, making communication impossible.

Referring to FIG. 4A, a time-advanced (e.g., advanced clock) cell 401 gives the intercell interference to surrounding cells 402 to 405 being serviced at the same frequency.

For example, a DL 422 of a time-advanced cell (including normal cells 416, 460, 466, 468, and 474) generates a large DL-to-UL interference in a UL subframe 414 immediately after a SSF 412, 418, 462, or 470 of the surrounding cells 402 to 405. The influence for each UL subframe symbol by the DL-to-UL interference may be confirmed as a pattern of signal quality (e.g., RSSI) measurement values for each symbol.

On the other hand, referring to FIG. 4B, in a time-delayed cell 451, large DL-to-UL interference may occur from the surrounding cells 452 to 455.

For example, in the UL 414, 420, 464, or 472 of the time-delayed cell 451 where asynchronous interference occurred, large DL-to-UL interference may occur from the DL 466 of the surrounding cells 452 to 455. The influence for each UL subframe symbol by the DL-to-UL interference may be confirmed as a pattern of signal quality (e.g., RSSI) measurement values for each symbol.

Figure 5:
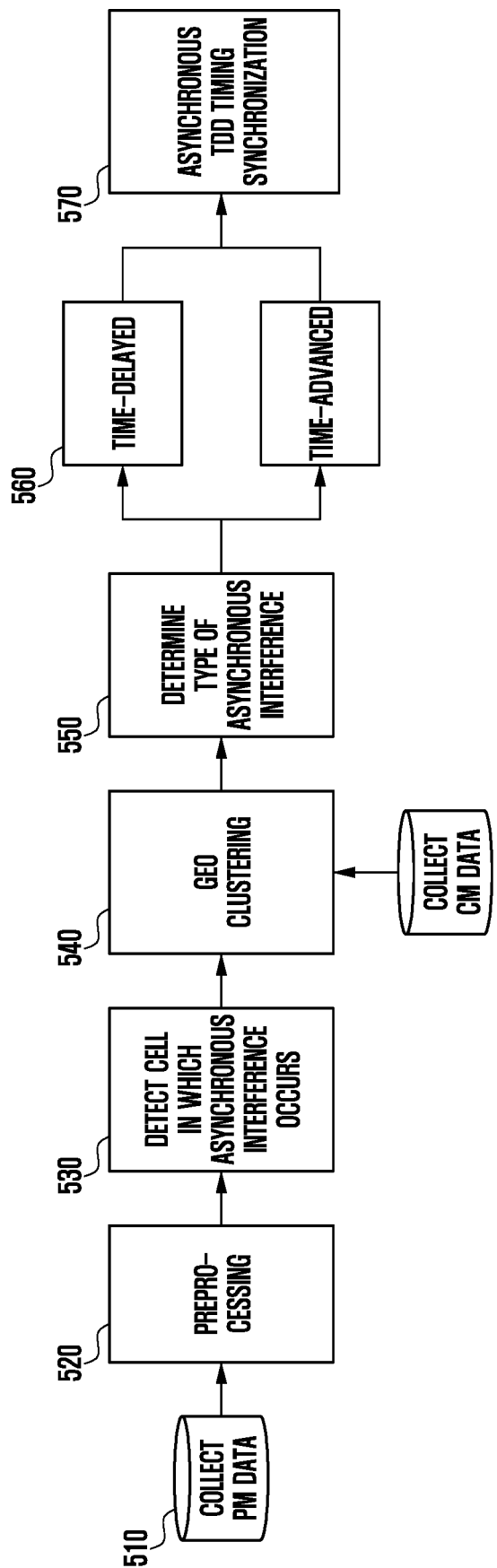
FIG. 5 is a diagram illustrating a basic operation according to an embodiment of the disclosure.

FIG. 5 is a diagram illustrating a basic operation according to an embodiment of the disclosure.

Referring to FIG. 5, it discloses a procedure for detecting cells where intercell interference occurs and detecting cells that generate intercell interference from the perspective of TDD interference by using performance management (PM) data.

The disclosure is configured with a step in which a network management node or management entity (hereinafter, 'network management node') receives information on a base station and performance management (PM) data in operation 510, a step of performing a preprocessing process based on the received data in operation 520, a step of detecting a cell in which asynchronous interference has occurred based on a result of performing the preprocessing process in operation 530, a step of forming a cluster of cells where asynchronous interference has occurred based on the geographical location of the cells where the asynchronous interference has occurred and the configuration management (CM) data in operation 540a step of determining the type of the asynchronous interference based on the formed cluster in operation 550, an operation 560 of specifying a cell generating asynchronous interference for each type based on the type of asynchronous interference, and an operation 570 of performing time synchronization with an adjacent cell in case that a cell generating the asynchronous interference is specified.

First, the network management node may receive information on the base station and performance management (PM) data in operation 510.

The PM data may be configured with an identifier for each base station, a cell identifier, an average value of an RSSI measurement value for each symbol, and a measurement time. The network management node may receive information on the base station together with the PM data. The information on the base station may include the geographical location or number of the base station.

Next, the preprocessing process is performed based on the received data. (520 operation) The preprocessing process is as follows.

Through the operation 520, an abnormal score may be obtained based on the collected PM data. When the abnormal score is calculated by using the values of each counter of the PM data, in case of a specific symbol, there may be a missing value, or there are cases where it has a value (e.g., 0 dBm) that is not significant due to an actual measurement problem, so the abnormal score may be calculated by considering these values. For example, when calculating the abnormal score, the abnormal score may be calculated after excluding the symbol value having the value of 0 dBm. The abnormal score is defined below.

The step in operation 530 of detecting a cell in which asynchronous interference has occurred based on a result of performing the preprocessing process is as follows.

The network management node periodically measures the received signal strength indicator (RSSI) value for each symbol of the UL subframe transmitted by each cell. In order to detect a cell in which a time asynchronous problem occurs in a TDD system, the network management node detects an abnormal cell in which a large DL-to-UL interference phenomenon appear based on the signal quality measurement value of the UL subframe. For example, in case that the RSSI value of a specific symbol of a specific cell is greater than a reference value, it can be considered that interference phenomenon has occurred in the specific symbol of the specific cell. Also, machine learning-based algorithms (e.g., PCA, Auto Encoder, and the like) may be applied or quantified by defining a formula, with each sample data which is configured with the RSSI value for each symbol of UL subframe of all cells in a certain range, collected by the network management node. For example, Principle Component Analysis (PCA) or Auto Encoder refers to a method for representing most data (e.g., 98% or more of the variance) with reduced number of dimension variables by dimensionally reducing (input data conversion) for multidimensional data. Thus, when the input data (each dimension may be an RSSI value for each symbol in the disclosure) is converted using the same conversion method, if the vector of the converted data is located differently from the converted vector of other data (mainly comparable to normal data), for the corresponding data, abnormal data may be classified through cluster analysis, and the like. Through this, it is possible to quantify how much the corresponding data differs from normal data.

In the disclosure, it is possible to determine whether interference has occurred by using a RSSI value of 7 to 12 (or 13) symbol (hereinafter, referred to as 'head-part symbol') and a RSSI value of 0 to 6 symbol (hereinafter, referred to as 'tail-part symbol') among 14 (each symbol may be defined as symbols 0 to 13) symbols of UL subframe. The RSSI value may be a maximum value or an average value of the corresponding symbol.

Hereinafter, in the disclosure, the abnormal score may be defined as a difference between an RSSI maximum value in a tail-part symbol and an RSSI maximum value in a head-part symbol. Based on the abnormal score, in case that the abnormal score value of a specific cell is greater than the reference value, it may be considered that interference has occurred in the corresponding symbol. For example, the reference value may be 3 dB, but the value may vary according to a user's setting.

Hereinafter, operations 540 to 570 will be described with reference to the drawings.

Figure 6:
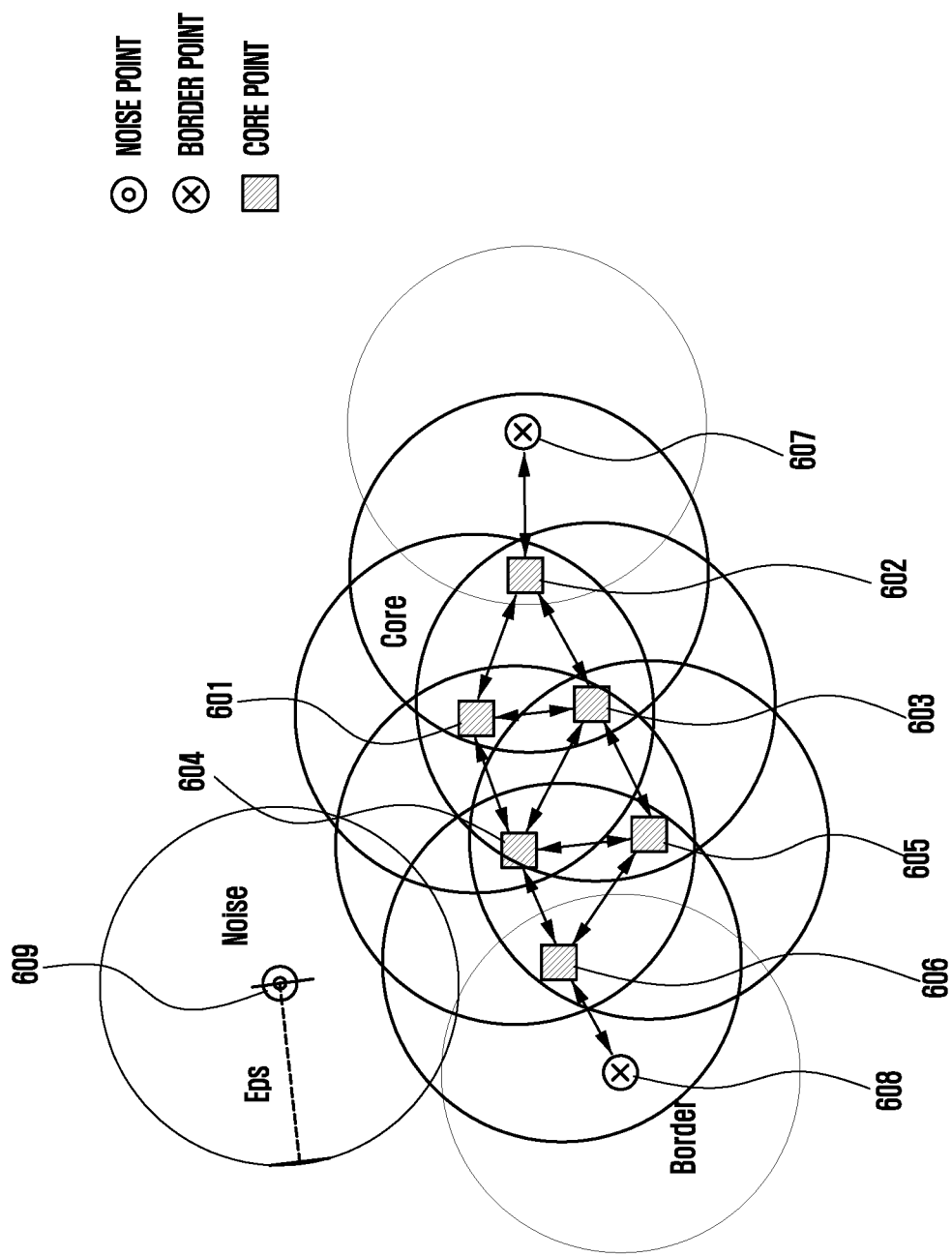
FIG. 6 is a diagram illustrating a step of forming a cluster of cells in which asynchronous interference occurs based on a geographical location of the cells in which asynchronous interference occurs according to an embodiment of the disclosure.

FIG. 6 is a diagram illustrating a step of forming a cluster of cells in which asynchronous interference occurs based on a geographical location of the cells in which asynchronous interference occurs according to an embodiment of the disclosure.

Referring to FIG. 6, depending on whether it is time 'd' or delayed, the range of cells subjected to intercell interference and the degree of interference may vary. In case that the time timing of the cell in which the asynchronous problem occurs is advanced when compared to the adjacent cells, DL-to-UL interference may be given to multiple surrounding cells. On the other hand, in case that the time timing of the cell in which the asynchronous problem occurs is delayed when compared to the adjacent cells, only the cell in which the asynchronous problem occurs may receive the DL-to-UL interference from the surrounding cells. Thus, the network management node performs geo-clustering using latitude and longitude values of cells in order to automatically distinguish whether cells in which asynchronous interference occurs collectively or sporadically on the network.

For example, in case of a first type (time-advanced case), other adjacent cells 602 to 608 may receive the DL-to-UL interference due to a cell 601 that generates asynchronous interference. The abnormal score value may decrease as the distance from the cell 601 (for example, the cell where the time asynchronous problem first occurred) that generates the asynchronous interference. In case that multiple cells having an abnormal score of more than a certain reference value exist geographically continuously, these cells may form one cluster. The process of forming the cluster is referred to as geo-clustering.

The geo-clustering may be configured with core points corresponding to cells 601 to 606 and border points corresponding to cells 607 to 608.

In case that the abnormal score value of a specific cell is equal to or higher than a certain standard, but it is determined that asynchronous interference has not occurred in the adjacent cell, the cell may have a large abnormal score value due to noise or may be a second type (time-delayed case). In addition, this may be due to geographical environment. Thus, a cell 609 does not belong to a geographical cluster.

As a specific embodiment of the disclosure, a density-based spatial clustering of applications with noise (DB-SCAN) algorithm, which is a machine learning-based algorithm, may be used for geo-clustering. For example, in applying the DBSCAN algorithm, the minimum distance may be 20 km, and the minimum neighboring cell may be set to two.

Figure 7:
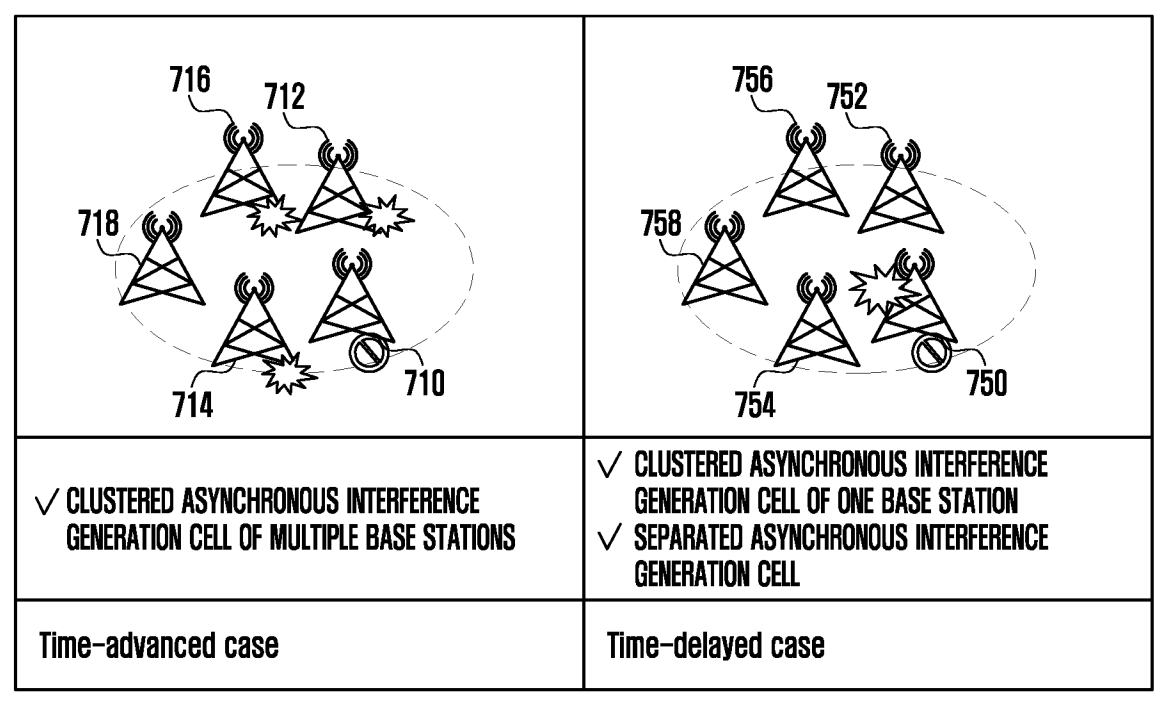

FIG. 7 is a diagram illustrating a process of determining the type of asynchronous interference based on the geo-clustering result according to an embodiment of the disclosure.

Referring to FIG. 7, if cells in which multiple asynchronous interference occurs form a cluster within a certain distance interval, the multiple cells may be multiple victim cells 712, 714, 716, and 718 by a cell 710 of a first type (time-advanced case). Thus, the cells 712, 714, 716, and 718 in which asynchronous interference belonging to the corresponding cluster occurs are regarded as victim cells, and a process of finding an aggressor cell 710, which is a cell that causes asynchronous interference, is performed.

On the other hand, if the cell in which asynchronous interference occurs does not form a cluster (in case that it is the only cell in which asynchronous interference occurs or it is far away from other asynchronous interference cells that make up the cluster), or even if a cluster is formed, if the corresponding cells belong to the same base station (e.g., eNB), the corresponding cell in which the asynchronous interference occurs is regarded as a cell 750 among cells 751, 754, 756, and 758 of the second type (time-delayed case), and there is no need to find the aggressor cell separately.

Whether or not the time asynchronous interference is actually determined in units of cells having different wireless environments, however, the subject that causes the time asynchronous problem may not be in the units of cells. For example, since the same clock is shared in the units of base stations (because time synchronization is made), the time asynchronous problem may occur in the units of base stations. Alternatively, if a timing problem (e.g., a problem related to common public radio interface (CPRI) delay correction) occurs in a specific radio unit (RU) belonging to the base station, the time asynchronous problem may occur in units of RUs.

The cause for which the TDD asynchronous problem may occur and the range of the entity may vary, and in the embodiment, it is assumed that the TDD asynchronous problem occurs in units of base stations.

Figure 8:
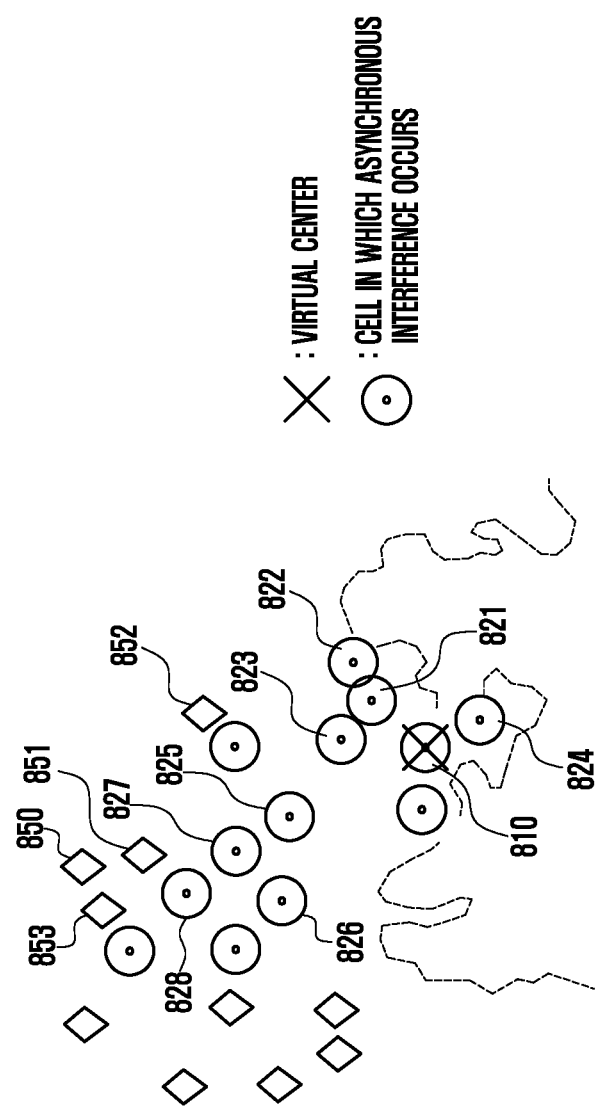
FIG. 8 is a diagram illustrating a method of setting a virtual center location to specify a cell generating asynchronous interference in case that a type of asynchronous interference is determined to be a time-advance case according to an embodiment of the disclosure.

FIG. 8 is a diagram illustrating a method of setting a virtual center location to specify a cell generating asynchronous interference in case that the type of asynchronous interference is determined to be a time-advance case according to an embodiment of the disclosure.

Referring to FIG. 8, it is assumed that the case that multiple victim cells 821 to 828 in which asynchronous interference occur and cells 850 to 853 capable of normal communication exist. In addition, in case that a cluster configured with the multiple victim cells 821 to 828 is formed through the geographical clustering, the virtual center location 810 can be determined based on the abnormal score of the cells in the cluster.

In determining the virtual center location, for the victim cell set (C victim) that has formed geographical clustering, the location (x_virtual, coordinate) of the virtual center point may be determined using a weighted average of the locations (x_c) of victim cells. The x_virtual may be calculated according to the following Equation.

$$x_{virtual} = \Sigma c \in C_{victim} W_C X_C \ldots \quad \text{Equation 1}$$

In the weighted average calculation, for the weight (w_c) for each cell, a pathloss exponent ($\propto$) assumed for RSSI and channel environment for each symbol received at the back and front of the corresponding cell may be used. The weight may be calculated according to the following Equation.

$$W_c = \frac{S_c}{\sum_{i \in C_{victim} - \{c\}} S_c} \quad \text{Equation 2}$$

The factors configuring Equation 2 are as follows.
$S_C = (D_C)^{1/\propto}$ ($\propto=3.4$, pathloss exponent)
$D_C = 10^{0.1 * Max_{tailpart}\{RSSI_{c,k}\}} - 10^{0.1 * Mean_{headpart}\{RSSI_{c,k}\}}$
$RSSI_{c,k}$: RSSI of the kth symbol of cell c [dBm]

Figure 9:
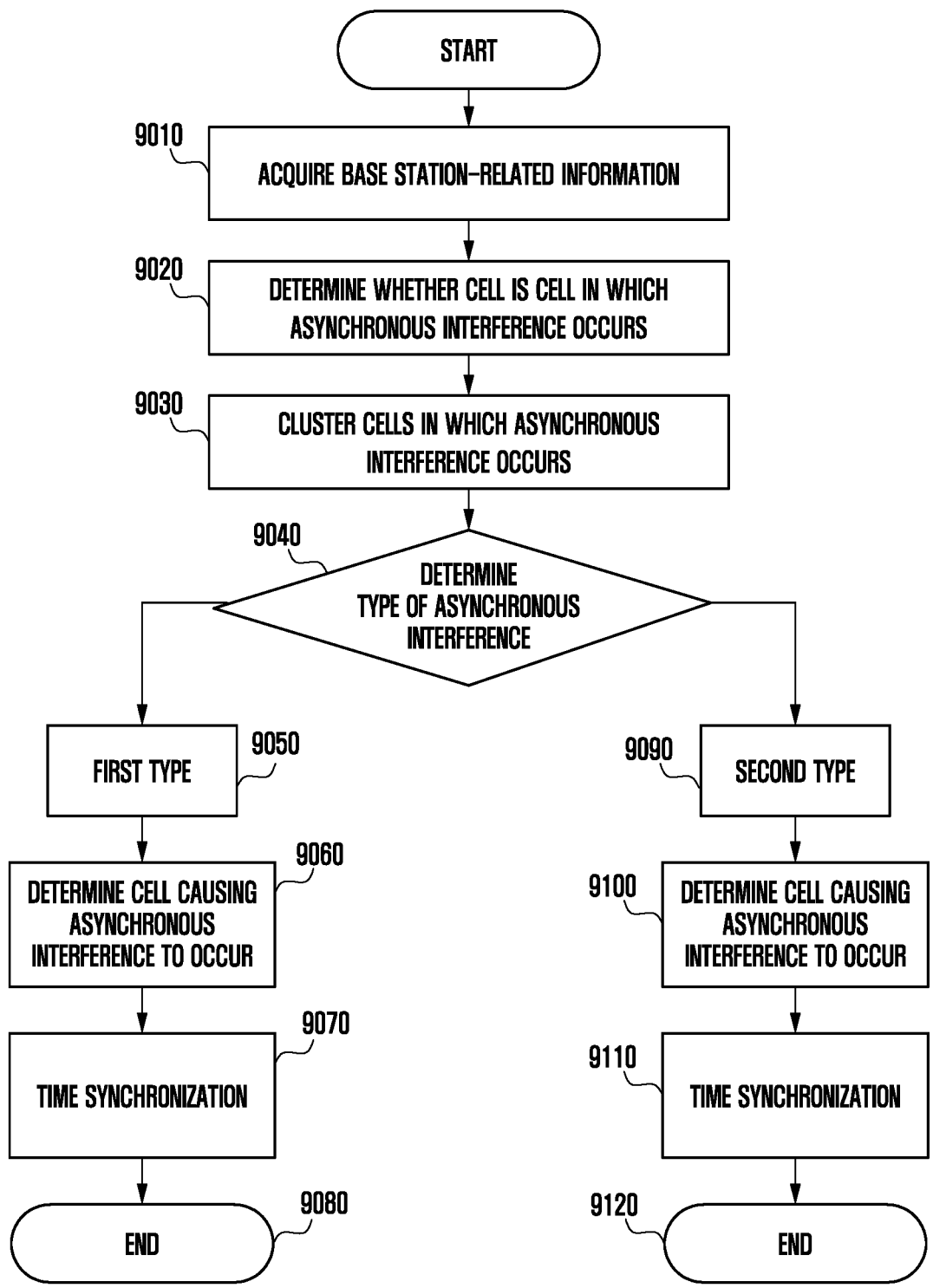
FIG. 9 is a flowchart illustrating a method of specifying a cell in which asynchronous interference occurs according to an embodiment of the disclosure.

FIG. 9 is a flowchart illustrating a method of specifying a cell in which asynchronous interference occurs according to an embodiment of the disclosure.

Referring to FIG. 9, in operation 9010, a base station or a separate network management node may receive information related to the base station. In addition, a preprocessing process may be performed based on the received data. The base station or the separate network management node may set the same time synchronization for each cell under the management of the corresponding node. In addition, RSSI for each symbol may be measured periodically for each cell. In addition, the RSSI measurement for each symbol may be aperiodic. In addition, the network management node may receive location information of each cell (or base station) under the management of the corresponding node from each base station. The location information may include latitude and longitude of the base station.

In operation 9020, the network management node may determine whether the cell is a cell in which time asynchronous interference occurs. More specifically, the network management node may use an abnormal score calculated based on RSSI values for each symbol or may apply a machine learning-based algorithm (e.g., PCA, Auto Encoder, and the like) to determine whether the cell is a cell in which time asynchronous interference occurs by using the collected performance management (PM) data.

For example, an example of applying the abnormal score by using the Auto Encoder is as follows. Auto Encoder is a type of Neural Network model that uses compression and restoration after learning to minimize the loss of restoration when compressing/restoring an input vector (or matrix). In the disclosure, when an AE model is learned with the data of cells (normal cells) in which asynchronous interference does not occur by using a vector having the RSSI value for each symbol as an element as input data X, a restoration error increases for input data of cells in which asynchronous interference occurs. Cells having such a restoration error equal to or greater than a predetermined value may be classified as cells in which asynchronous interference occurs.

In operation 9030, the network management node may form geo-clustering for cells in which asynchronous interference occurs. The process of forming the cluster is referred to FIG. 6.

In operation 9040, the type of asynchronous interference may be determined based on the formed cluster. The corresponding operation is referred to FIG. 7.

In case that the type of asynchronous interference is determined to be a time-advance case, 9050 to 9080 operations illustrate a method of specifying a cell that generates asynchronous interference. Operation 9060 will be described in FIG. 10.

In case that the type of asynchronous interference is determined to be a second type (time-delayed case), operations 9090 to 9120 illustrate a method of specifying a cell that generates asynchronous interference. Operations 909 to 912 will be described in FIG. 11.

Figure 10:
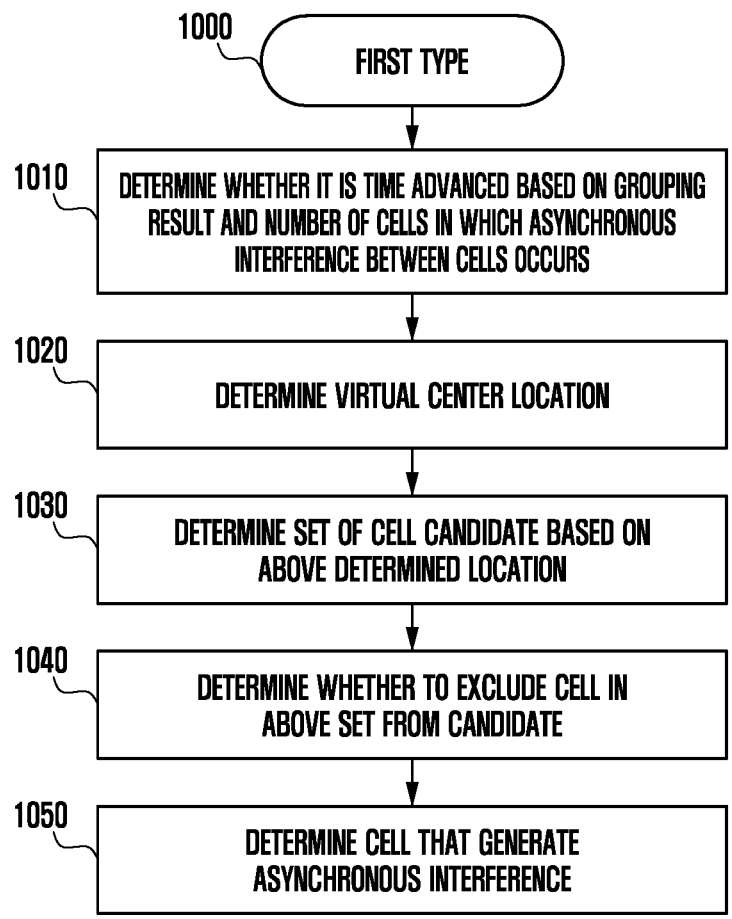
FIG. 10 is a diagram illustrating a step of specifying a cell that generates asynchronous interference in case that a type of asynchronous interference is determined to be a time-advance case according to an embodiment of the disclosure.

FIG. 10 is a diagram illustrating a step of specifying a cell that generates asynchronous interference in case that a type of asynchronous interference is determined to be a time-advance case according to an embodiment of the disclosure.

Referring to FIG. 10, in operation 1010, in case that there are cells in which multiple asynchronous interference that have formed a cluster due to geographical clustering occurs, it may correspond to a time-advance case. In this case, in order to specify the cell that generates asynchronous interference, the cell generating the asynchronous interference is determined based on locations of victim cells and abnormal score values of the victim cells.

In the time-advance case, the step of specifying one or more cells as aggressor cells are configured with a step of determining the estimated virtual center location by considering the error of the estimated position in operation 1020, a step of considering cells within a certain distance from the virtual center location as a 'candidate set of aggressor cell' (hereinafter, 'a first candidate set') in operation 1030, a step of determining whether to exclude a specific cell from the first candidate set among cells belonging to the first candidate set in operation 1040, and a step of determining the cell (or base station) closest to the virtual center location among the remaining cell candidates except for the specific cell as the cell that generates interference in operation 1050.

In operation 1020, in case that a cluster configured with multiple victim cells is formed, the virtual center location may be determined based on the abnormal score of the cells in the cluster. For a detailed description thereof, refer to FIG. 8.

In operation 1030, the 'first candidate set' including all cells existing within a certain distance based on the virtual center location is set. The certain distance may vary according to user settings.

In operation 1040, the step of determining whether to exclude a specific cell belonging to the first candidate set from the first candidate set may include the following steps. The order of each step may be changed.

For example, a cell currently operating among cells belonging to the first candidate set may be excluded. For another example, cells having the abnormal score which is equal to or less than a certain standard may be excluded from the candidate group. For still another example, cells which are not the victim cells may be excluded from the candidate group by comparing the victim cells with cells belonging to the first candidate set. For still another example, cells having the abnormal score smaller than a maximum value of the abnormal score of cells belonging to the first candidate set may be excluded.

In operation 1050, a cell located closest to the virtual center location among the remaining cells in the first candidate set may be specified as a cell generating time asynchronous interference.

Figure 11:
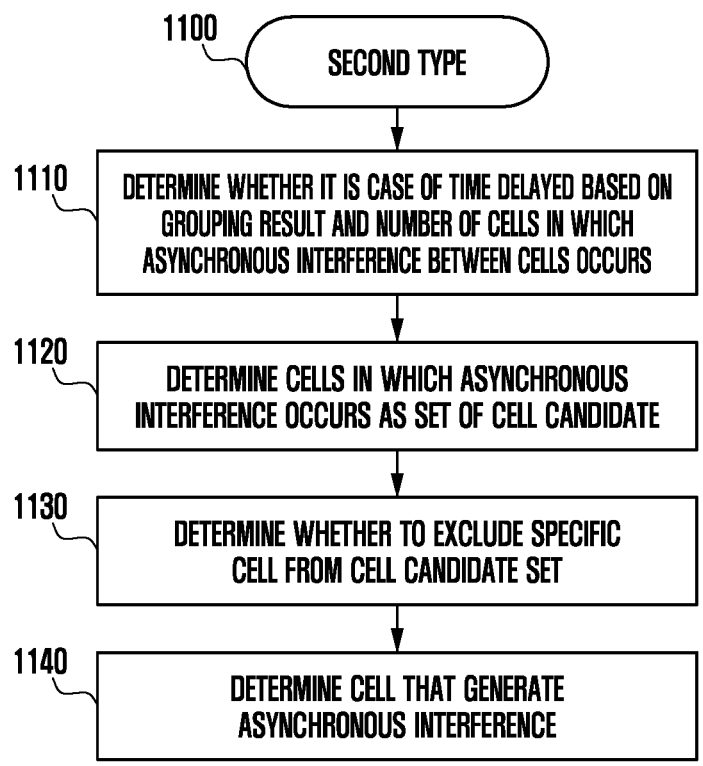
FIG. 11 is a diagram illustrating a step of specifying a cell that generates asynchronous interference in case that a type of asynchronous interference is determined to be a second type (time-delayed case) according to an embodiment of the disclosure.

FIG. 11 is a diagram illustrating a step of specifying a cell that generates asynchronous interference in case that a type of asynchronous interference is determined to be a second type (time-delayed case) according to an embodiment of the disclosure.

Referring to FIG. 11, in operation 1110, in case that asynchronous interference occurs in a specific cell, but an isolated cell in which there is no cell in which asynchronous interference occurs within the coverage of the cell, or a cluster formed, but cells belonging to the cluster belong to the same base station or the same entity, the corresponding specific cell may be estimated to be of the second type (time-delayed case).

In the second type (time-delayed case), the step of specifying one or more cells into cells (cells that receive DL-to-UL interference from surrounding cells) that generate interference is configured with a step of determining cells estimated to be of the second type (time-delayed case) as a 'cell candidate set' (hereinafter, 'second candidate set') in operation 1120, ii) a step of determining whether to exclude a specific cell belonging to the second candidate set from the second candidate set in operation 1130, and iii) a step of determining a cell belonging to the remaining second candidate set as a cell generating interference in operation 1140.

In operation 1130, the step of determining whether to exclude the specific cell belonging to the second candidate set from the second candidate set may include the following steps. The order of each step may be changed.

For example, a cell currently operating among cells belonging to the second candidate set may be excluded. For another example, it may be determined based on an average value of abnormal scores of cells belonging to the second candidate set. In other words, by calculating the average value of the abnormal score of cells belonging to the second candidate set, if the abnormal score value of a specific cell is equal to or less than the average value, the specific cell may be excluded from the second candidate set.

For still another example, in case that a cell of a first type (time-advanced case) is specified, cells to be excluded from the second candidate set may be determined based on the cells. This will be described in FIG. 10. For still another example, if the abnormal score value is high only in some cells among all cells in a specific base station or specific entity, it is considered that the abnormal score value has increased due to noise, and the corresponding cell may be excluded from the second candidate set.

In operation 1140, cells in the second candidate set remaining through operation 1130 may be specified as cells (cells which is the second type (time-delayed case)) generating time asynchronous interference.

Figure 12:
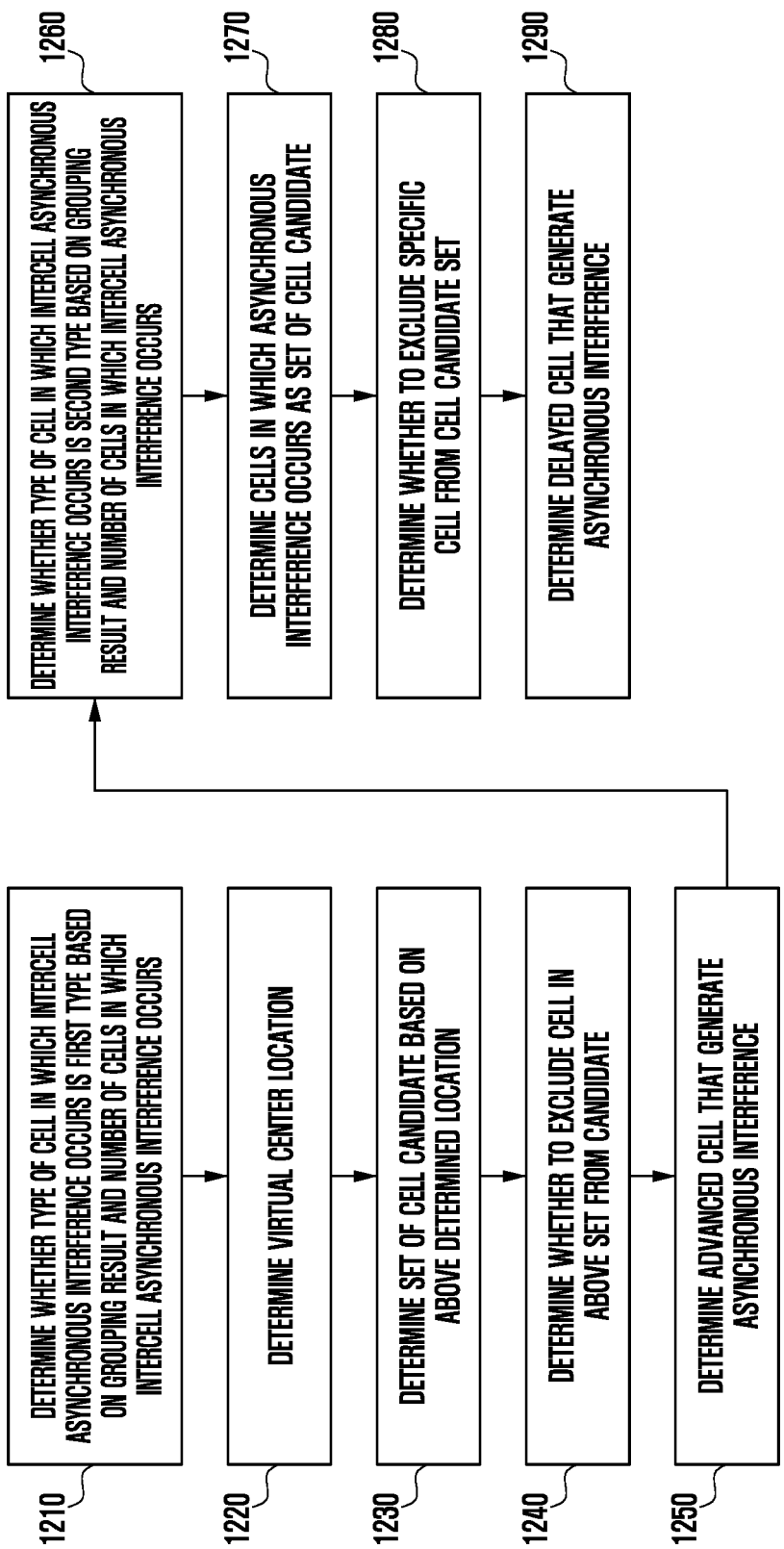
FIG. 12 is a diagram illustrating a step of specifying a cell that generates asynchronous interference based on the cell in case that the cell that is a first type (time-advanced case) is specified according to an embodiment of the disclosure.

FIG. 12 is a diagram illustrating a step of specifying a cell that generates asynchronous interference based on the cell in case that the cell that is a first type (time-advanced case) is specified according to an embodiment of the disclosure.

Referring to FIG. 12, a cell which is the first type (time-advanced case) and a cell which is a second type (time-delayed case) may exist simultaneously. Even if a cluster is formed in a certain area due to a cell which is the first type of cell (time-advanced case), depending on a situation, such as a geographical condition, base station density, and the like, there may be cells in which isolated asynchronous interference occur at a far distance from the cluster or cells in which a small number of asynchronous interference occurs belonging to the same base station or entity.

The step of specifying the cell that is the first type (time-advanced case) is to refer to FIG. 10.

Operations 1210 to 1250 correspond to operations 1010 to 1050. In addition, the step of specifying the cell that is the second type (time-delayed case) is referred to FIG. 11. Operations 1260 to 1270 correspond to operations 1110 to 1120.

In operation 1280, the step of determining whether to exclude a specific cell belonging to the second candidate set from the second candidate set may include the following steps. The order of each step may be changed.

For example, a cell currently operating among cells belonging to the second candidate set may be excluded. For another example, it may be determined based on an average value of abnormal scores of cells belonging to the second candidate set. In other words, by calculating the average value of the abnormal score of cells belonging to the second candidate set, if the abnormal score value of the specific cell is equal to or less than the average value, the specific cell may be excluded from the second candidate set. For still another example, in case that a cell which is the first type (time-advanced case) is specified, the specified cell may be excluded from the second candidate set because the specified cell has already been specified as an aggressor cell. For still another example, in case that the abnormal score value is large only in some cells among all cells in the base station or entity, it is considered that the abnormal score value has increased due to noise, and the corresponding cell may be excluded from the second candidate set.

Additionally, when performing operation 1280, in case that the aggressor cell, which is the first type (time-advanced case), is specified at the same time, in case that an isolated cell within a certain distance from the first type of aggressor cell or a cluster is formed within a certain distance from the aggressor cell but the cells in the cluster belong to the same base station or entity, the cells may be determined to be the victim cell which is not the second type (time-delayed case). Thus, the cells may be excluded from the second candidate set.

In operation 1290, cells in the second candidate set remaining through operation 1280 may be specified as the cell (the cell which is a second type (time-delayed case)) that generate time asynchronous interference.

In a real network environment, even if time synchronization occurs, DL-to-UL interference in a TDD system is received after a propagation delay time due to propagation time of a radio signal. Thus, a time difference due to asynchronous interference may be determined based on a distance between cells transmitting and receiving the interference signal.

In case of the first type (time-advanced case), the time difference may be determined by using the distance between the aggressor cell in which the time asynchronous problem occurs (which causes time asynchronous interference) and the victim cell. In case of the second type (time-delayed case), the time difference may be determined by using the distance between the cell in which the time asynchronous problem has occurred and the cells adjacent to the cell.

Hereinafter, a method of determining the time difference (e.g., drift time) based on the first type is disclosed.

First, the location $k_{first}$ of the symbol in which the symbol RSSI value is rapidly increased among the symbols of the tail-part is confirmed. The location of the symbol may be expressed as a k-th symbol. The symbol RSSI value in the symbol of the tail-part may be confirmed through PM data. In addition, a propagation delay according to a propagation speed may occur according to a distance between the aggressor cell and the specific victim cell. Thus, the time difference may be calculated by adding the propagation delay time $t_{prop,c}$ to the time $t_{impacted,c}$ at which the actual interference occurs.

$t_{impacted,c}$ is calculated by subtracting the number (For example, in case of the 8th symbol, the number may be 7) corresponding to the location of the symbol whose symbol RSSI value has risen rapidly from the number of symbols of one subframe (e.g., 14), and multiplying the subtracted number by the time $T_{symbol}$ corresponding to one symbol. The $T_{symbol}$ is determined according to the bandwidth of the base station, but in the embodiment, it is assumed to be 71.42 [μs]. For example, assuming that the symbol RSSI value rapidly rises in symbol 10 among symbols 0 to 13, the $t_{impacted,c}$ may be calculated as (14−10)×71.42[μs].

In addition, the propagation delay time $t_{prop,c}$ is calculated by dividing the distance between the aggressor cell and the victim cell by the propagation speed $v_{prop}$. For example, the propagation speed may be calculated by dividing the distance between cells by $T_{symbol}$.

The time difference may be calculated according to the following Equations.

$$t_{advanced,c} = t_{prop,c} + t_{impacted,c} \quad \cdots \quad \text{Equation 3}$$

$$t_{impacted,c} = (N_{symbols} - k_{first}) \times T_{symbol} \quad \cdots \quad \text{Equation 4}$$

$$t_{prop,c} = \text{Distance}(x_{detected_{eNB}}, x_c) / v_{prop} \quad \cdots \quad \text{Equation 5}$$

Based on the above Equations, in case that the time difference due to the asynchronous interference is determined, the network management node may control to perform synchronization for the time difference. The time synchronization means that the time of all cells under the management of the network management node is set to be the same.

Figure 13:
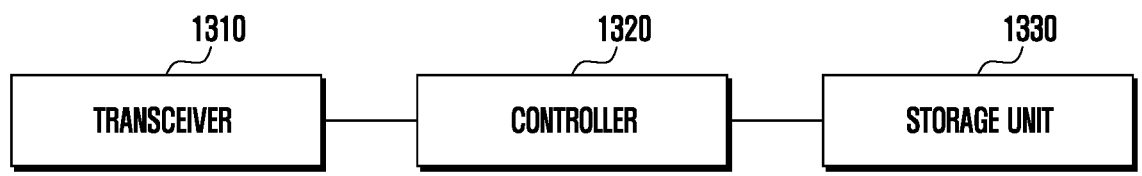
FIG. 13 is a block diagram illustrating a network management node capable of performing the disclosure according to an embodiment of the disclosure.

FIG. 13 is a block diagram illustrating a network management node capable of performing the disclosure according to an embodiment of the disclosure.

Referring to FIG. 13, a network management node 1300 includes a transceiver 1310, a controller (control unit) 1320, and a storage unit 1330. However, the components of the network management node 1300 are not limited to the above-described example, and for example, the network management node 1300 may include more or fewer components than the illustrated components. In addition, the transceiver 1310, the storage unit 1330, the controller 1320, and the like may be implemented in a single chip form.

The transceiver 1310 may transmit and receive signals to and from the base station. Here, the signal may include control information and data. To this end, the transceiver 1310 may be configured with a radio frequency (RF) transmitter that up-converts and amplifies the frequency of a transmitted signal, an RF receiver that amplifies a received signal with low noise and down-converts its frequency, and the like. However, this is only an embodiment of the transceiver 1310, and the components of the transceiver 1310 are not limited to the RF transmitter and the RF receiver. In addition, the transceiver 1310 may receive a signal through a wireless channel, output the signal to the controller 1320, and transmit the signal outputted from the controller 1320 through the wireless channel. In addition, the transceiver 1310 may be equipped with an RF transceiver for the first wireless communication technology and an RF transceiver for the second wireless communication technology separately or may perform physical layer processing according to the first wireless communication technology and the second wireless communication technology with one transceiver.

The storage unit 1330 may store information on the base station. In addition, the storage unit 1330 may store control information or data included in signals transmitted and received by the network management node 1300. The storage unit 1330 may be configured with a storage medium, such as a read only memory (ROM), a random access memory (RAM), a hard disk, a compact disc (CD)-ROM, a digital versatile disc (DVD), and the like, or a combination of storage media. In addition, the number of storage units 1330 may be plural.

The controller 1320 may control a series of processes so that the network management node 1300 may operate according to the above-described embodiment of the disclosure. For example, the controller 1320 may transmit and receive data with the first base station in the second frequency band based on resource allocation information received from the base station through the transceiver 1310. The number of the controller 1320 may be plural, and the controller 1320 may perform a component control operation of the network management node 1300 by executing a program stored in the storage unit 1330. For example, the controller may include one or more processors.

Various embodiments of the disclosure may be implemented as software including one or more instructions stored in a storage medium readable by a machine. It can be. For example, a processor of the machine calls at least one command among one or more instructions stored from a storage medium and enables the machine to be operated to perform at least one function according to the called at least one instruction. The one or more instructions comprises a code generated by a compiler or code executable by an interpreter. The storage medium readable by the machine may be provided in the form of a non-transitory storage medium. The term 'non-transitory' refers that the storage medium is tangible and does not contain signals (e.g., electromagnetic waves), and the term does not distinguish between the case where data is stored semi-permanently and temporarily stored in the storage medium.

According to an embodiment, the method according to various embodiments of the disclosure may be included and provided in a computer program product. The computer program product may be traded between sellers and buyers as commodities. The computer program product is distributed in the form of a device-readable storage medium (e.g., compact disc read only memory (CD-ROM)), or distributed (e.g., downloaded or uploaded) on online through an application store (e.g., Play Store™) or between two user devices (e.g., smart phones) directly. In the case of online distribution, at least part of the computer program product may be temporarily stored or temporarily created in a storage medium readable by a device such as a manufacturer's server, an application store server, or a relay server's memory.

According to various embodiments, each component (e.g., module or program) of the above-described components may include a single entity or a plurality of entities, and some of the plurality of entities may be separately disposed in other components. According to various embodiments, one or more components or operations among the aforementioned corresponding components may be omitted, or one or more other components or operations may be added. Alternatively or additionally, a plurality of components (e.g., modules or programs) may be integrated into a single component. In this case, the integrated component may perform one or more functions of each of the plurality of components identically or similarly to those performed by a corresponding component of the plurality of components prior to the integration. According to various embodiments, the operations performed by a module, program, or other component are executed sequentially, in parallel, iteratively, or heuristically, or one or more of the operations are executed in a different order, or omitted. or one or more other actions may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a network management node in a communication system, the method comprising:
    obtaining location information for a plurality of base stations and received signal strength indication (RSSI) information for each uplink symbol in a plurality of cells supported by the plurality of base stations;
    identifying at least one victim cell having an asynchronous interference from among the plurality of cells based on the RSSI information;
    determining a type of the asynchronous interference based on the location information and the number of cells in the at least one victim cell;
    in accordance with a determination that the type is a first type, adjusting a synchronization for an aggressor cell causing the asynchronous interference to the at least one victim cell; and
    in accordance with a determination that the type is a second type, adjusting a synchronization for the at least one victim cell causing the asynchronous interference.

2. The method of claim 1,
    wherein, when the type is the first type, the aggressor cell is a time-advanced cell and the at least one victim cell is a normal cell,
    wherein, when the type is the second type, the at least one victim cell is a time-delayed cell, and
    wherein the plurality of cells has a same time division duplex (TDD) configuration.

3. The method of claim 2, wherein the adjusting of the synchronization for the aggressor cell comprises:
    determining a location of virtual center based on the location information and the RSSI information;
    determining cells within a predetermined distance from the virtual center as a set of cell candidates; and
    excluding a specific cell from the set of cell candidates based on a predetermined standard.

4. The method of claim 3, wherein the excluding of the specific cell comprises:
    excluding the specific cell from the set of cell candidates based on a value determined using the RSSI information.

5. The method of claim 4, further comprising:
    identifying the aggressor cell that is closest to the location of virtual center, among cells in the set of cell candidates.

6. The method of claim 4, wherein adjusting of the synchronization for the aggressor cell comprises:
    determining a time difference due to the asynchronous interference based on a distance between the aggressor cell and at least one victim cell; and
    adjusting the synchronization for the aggressor cell causing the asynchronous interference to the at least one victim cell based on the time difference.

7. The method of claim 1, wherein the adjusting of the synchronization for the at least one victim cell comprises:
    determining cells having the asynchronous interference as a set of cell candidates; and
    excluding a specific cell from the set of cell candidates based on a predetermined standard.

8. The method of claim 7, wherein the excluding of the specific cell comprises identifying the at least one victim cell by excluding the specific cell from the set of cell candidates based on a predetermined value.

9. The method of claim 8, wherein adjusting of the synchronization for the at least one victim cell comprises:
    identifying a distance between at least one victim cell and a normal cell;
    determining a time difference due to the asynchronous interference based on the distance; and
    adjusting the synchronization for the at least one victim cell based on the time difference due to the asynchronous interference.

10. A network management node in a communication system, the network management node comprises:
    a transceiver; and
    at least one processor configured to:
    obtain location information for a plurality of base stations and received signal strength indication (RSSI) information for each uplink symbol in a plurality of cells supported by the plurality of base stations,
    identify at least one victim cell having an asynchronous interference from among the plurality of cells based on the RSSI information,
    determine a type of the asynchronous interference based on the location information and the number of cells in the at least one victim cell,
    in accordance with a determination that the type is a first type, adjust a synchronization for an aggressor cell causing the asynchronous interference to the at least one victim cell, and
    in accordance with a determination that the type is a second type, adjust a synchronization for the at least one victim cell causing the asynchronous interference.

11. The network management node of claim 10,
    wherein, when the type is the first type, the aggressor cell is a time-advanced cell and the at least one victim cell is a normal cell,
    wherein, when the type is the second type, the at least one victim cell is a time-delayed cell, and
    wherein the plurality of cells has a same time division duplex (TDD) configuration.

12. The network management node of claim 11, wherein the at least one processor, is further configured to:
    determine a location of virtual center based on the location information and the RSSI information,
    determine cells within a predetermined distance from the virtual center as a set of cell candidates, and
    exclude a specific cell from the set of cell candidates based on a predetermined standard.

13. The network management node of claim 12, wherein the at least one processor is further configured to:

identify the aggressor cell that is closest to the location of virtual center, among cells in the set of cell candidates.

* * * * *